May 15, 1934.  F. G. SPENCER  1,958,723
FIFTH WHEEL
Filed Feb. 9, 1933  3 Sheets—Sheet 1

Inventor
Fred G. Spencer

By Jack A. Ohley
Attorney

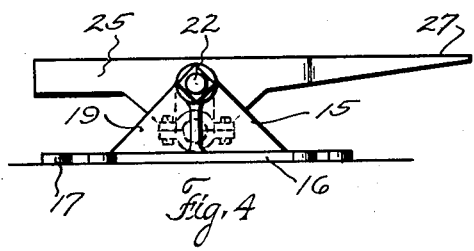
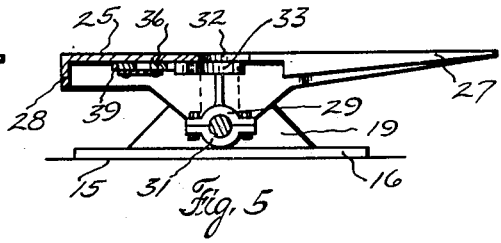
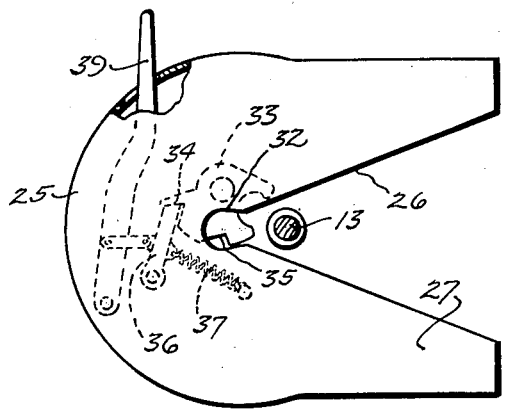
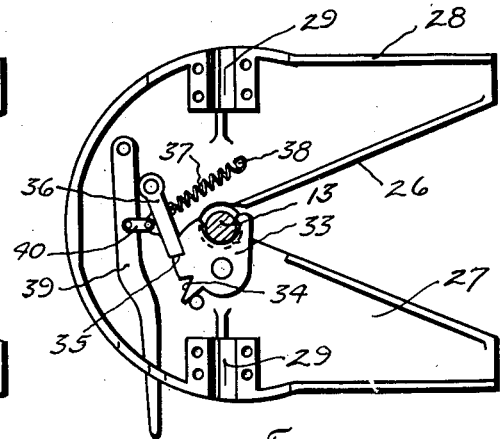
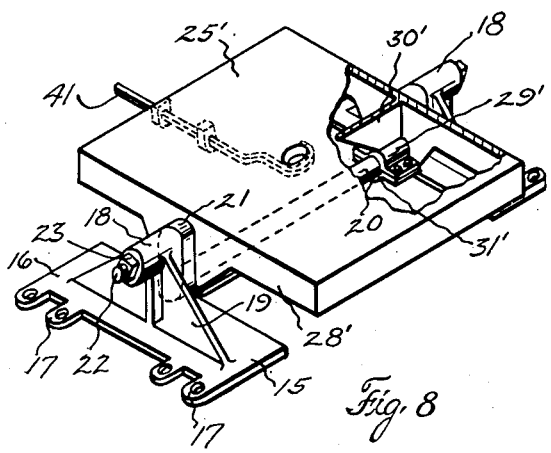
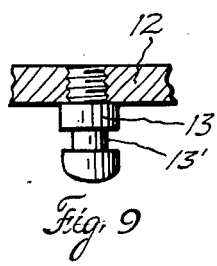

May 15, 1934.  F. G. SPENCER  1,958,723
FIFTH WHEEL
Filed Feb. 9, 1933  3 Sheets-Sheet 3

Inventor
Fred G. Spencer
By Jack A. Ochley
Attorney

Patented May 15, 1934

1,958,723

UNITED STATES PATENT OFFICE 1,958,723

FIFTH WHEEL

Fred G. Spencer, Augusta, Kans., assignor to Spencer Trailer Company, Augusta, Kans., a co-partnership consisting of Fred G. Spencer and Bertha Spencer Application February 9, 1933, Serial No. 655,912

14 Claims. (Cl. 280—33.1)

This invention relates to new and useful improvements in fifth wheels.

One object of the invention is to provide an improved fifth wheel and particularly a combination fifth wheel and coupler for connecting a tractor and trailer or the like.

Prior to my invention fifth wheels and couplers have been provided whereby the tractor and trailer may undergo rotation relatively of each other, as in making turns, and efforts have been made to absorb the road shocks, as well as those incidental to stopping and starting, by employing springs, rubbers and similar devices. Extended tests have shown that these devices do not eliminate such shocks.

A particular object of the invention is to provide an improved fifth wheel including a swinging or cradle mounting, movable in the line of draft, whereby road shocks, as well as those resulting from starting and stopping, are substantially absorbed or eliminated, and a more satisfactory and efficient device is produced.

A further object of the invention is to provide a fifth wheel mounting wherein the amplitude of the swinging or cradle action is such as to produce a floating connection between the tractor and trailer, as well as to be substantially shock-proof.

Another object of the invention is to provide a fifth wheel and coupler between a tractor and a trailer, constructed so that the tractor may start in motion prior to picking up the load imposed by the trailer, thus preventing overloading the tractor engine and making for easier starting, as well as saving in wear and tear in the vehicles.

Still another object of the invention is to provide a fifth wheel having such a range of movement as to facilitate coupling when it is backed under the king or pivot stud of the trailer, so as to make coupling less difficult, as well as requiring less exactness in positioning the members.

A construction designed to carry out the invention will be hereinafter described, together with other features of the invention.

The invention will be more readily understood from a reading of the following specification and by reference to the accompanying drawings in which an example of the invention is shown, and wherein.

Figure 3:
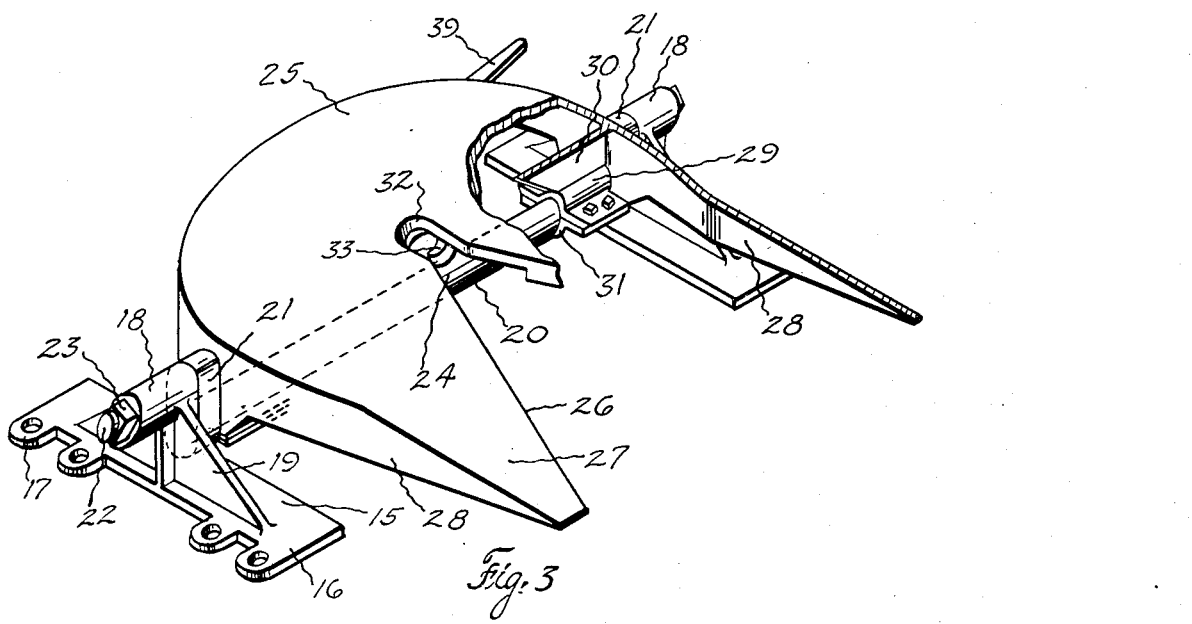
Figure 10:
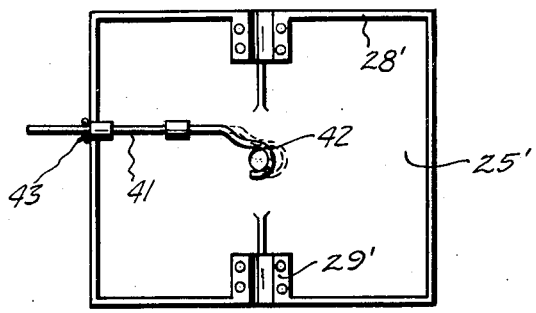
Figure 11:
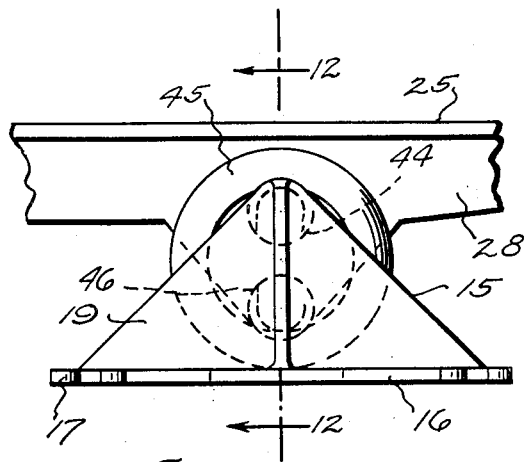
Figure 12:
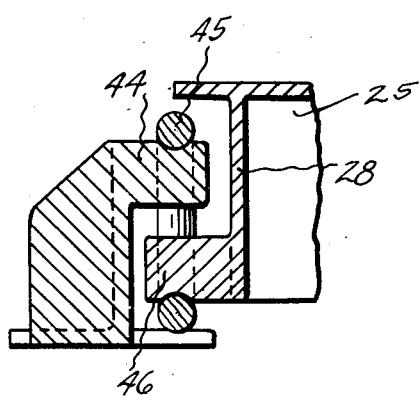
Figure 13:
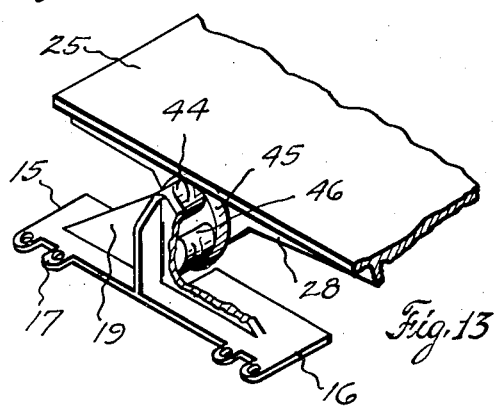

Figure 3 is a view of a fifth wheel constructed in accordance with the invention, partly in perspective and partly in section, Figure 4 is a reduced side elevation of the fifth wheel in coupled position, Figure 5 is a longitudinal sectiontal view of the same, Figure 6 is a plan view of the fifth wheel plate or table, Figure 7 is an underside view of the same, Figure 8 is a view of another form, in which the invention may be carried out, partly in section and partly in perspective, Figure 9 is a detail of the king pin or stud, Figure 10 is an underside view of the plate shown in Figure 8, Figure 11 is a partial side elevation of still another form, Figure 12 is a transverse sectional view taken on the line 12—12 of Figure 11, and Figure 13 is a fragmentary perspective view of the device shown in Figure 11.

This application is filed as a continuation in part of my co-pending application filed August 20, 1932, Serial No. 629,599.

Figure 1:
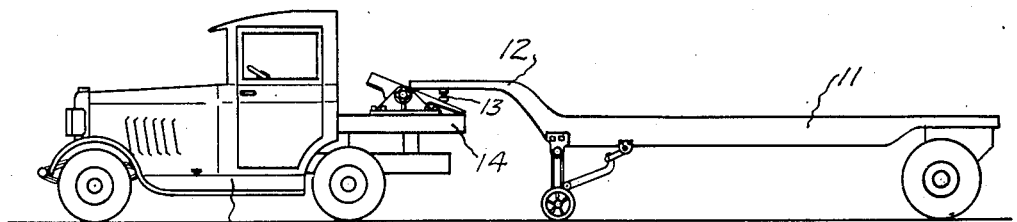
Figure 1 is a side elevation of a tractor and a trailer prior to coupling.

In the drawings the numeral 10 designates a tractor of approved construction and 11 a trailer of the two-wheel type, although a four-wheel type may be used. The trailer has the usual forwardly extending shank or tongue portion 12 which carries the depending king pin or stud 13, as is shown in Figures 1 and 9.

On the bed or platform 14 of the tractor 11 is fastened a pair of bearing standards or pillow blocks 15. Each standard includes a flat base 16 provided with ears 17 along its outer side, whereby it may be securely bolted on the bed 14. A transverse bearing sleeve 18 is made integral with the web 19 of each standard.

A crank shaft 20 is mounted between the standards and includes cranks 21 at each end having trunnions 22 journaled in the bearing sleeves 18. The cranks bear against the inner ends of the sleeves so as to reduce side thrust. Nuts 23 screwed into the ends of the trunnions engage the outer ends of the sleeves. The trunnions have a free turning fit in the sleeves, whereby the crank shaft may readily swing.

The throw of the cranks 21 determines the amplitude of the arc in which the shaft swings. The shank 24 of the shaft being well below the bearing points of the trunnions, it is obvious that said shank will swing in a vertical arc of considerable amplitude. Any member mounted on this shank will likewise undergo an amplitude swinging or cradle motion.

In Figures 1 to 7 inclusive, a fifth wheel plate or member 25 is shown fastened on the shaft 20 between the cranks 21 thereof. The plate may have any suitable shape, but I prefer to form it with a general U-shape and a central longitudinal flared crotch or throat 26 in its rear portion. The rear extremities of the plate on each side of the crotch form guide legs 27 A marginal apron or skirt 28 depends from the edge of the plate and merges into the tips of the legs. The fifth wheel plate is subjected to heavy loads and strains and must be substantial.

Figure 2:
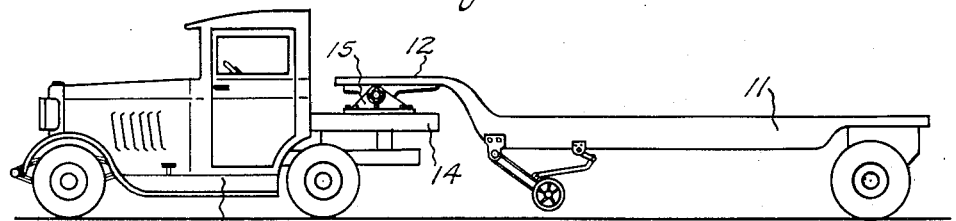
Figure 2 is a similar view showing the tractor and trailer coupled.

Bearing boxes 29 formed integral with the apron are connected with the undersides of the plate 25 by webs 30. The boxes rest upon the shank 24 of the crank shaft, which is retained by caps 31. The plate is thus hinged on the shaft so as to freely swing between the cranks 21. By this arrangement the plate may assume a substantially horizontal position, as is shown in Figures 2, 4 and 5, and at the same time it is free to swing in a vertical arc. This swinging or cradle movement of the plate permits it to move forwardly and rearwardly of the pivots of the crank shaft and over the bed 14, as well as vertically thereof.

The shank 24 of the crank shaft 20 is mounted transversely of the plate 25 at such a point that the rear portion of said plate overbalances the forward portion and normally the legs 27 rest upon the bed 14 of the tractor, as is shown in Figure 1. When the tractor bed 14 is backed under the shank 12 of the trailer the stud 13 is received in the crotch 26; but should it engage the inclined surfaces of the legs 27 of the tilted plate, it may be readily displaced into the crotch by thrusting the shank 12 to either side. This structure makes for easy coupling.

The crotch 26 converges to a keeper slot 32 over the shank 24 of the crank shaft and the stud 13 is finally received in this slot. While any suitable latch or keeper may be employed to retain the stud 12 in the slot, I have illustrated an automatic latch which includes a locking jaw 33 pivoted to the underside of the plate 25, so as to lie in the slot in the path of the stud, as is shown in Figure 6. The jaw is provided with notches 34 and 35. A latch bar 36 is also pivoted to the underside of the plate has its outer end in engagement with the notch 34, whereby the jaw is latched in the position shown in Figure 6. The bar 36 is attached to one end of a coiled spring 37 which is attached to a stud 38.

When the stud 13 engages the jaw 33 and the coupling operation continues, the jaw is swung, whereby the latch bar is displaced. As the jaw swings into its locking position, as shown in Figure 7, the latch bar is swung into the notch 35 and the jaw thus locked. The stud is formed with an annular groove 13' which receives the jaw, whereby the stud is held against upward displacement and dis-connection from the fifth wheel. When the stud engages the forward end of the slot 32 the plate 25 is swung to a horizontal position, as is shown in Figures 2, 4 and 5. For releasing the stud 13 a lever 39, pivoted on the underside of the plate, extends through the apron 28. This lever is pivoted to a link 40 which in turn is pivoted to the latch bar 36 opposite the spring 37. By swinging the lever the latch bar is withdrawn and the jaw 33 is released.

The important feature of the invention is the mounting of the fifth wheel plate 25. It is obvious that the shank 24 of the crank shaft 20 may swing through a vertical arc of approximately 180 degrees, during which movement the plate will maintain its horizontal position. The pull of the tractor 10 will tend to swing the plate rearwardly and thus when the tractor starts its initial movement it will swing said plate before transmitting motion, the trailer 11 thereby picking up the load much easier.

By far the greatest advantage results from absorbing the road shocks during transit. If the trailer should ride forwardly with relation to the tractor, this independent movement will swing the fifth wheel forwardly in the line of draft and thus take up such independent movement before it is transmitted to the tractor. Independent movement of the tractor which would impart a shock to the trailer is likewise absorbed in the swinging of the fifth wheel. The amplitude of the swing is of such length as to fully take up all shocks and the driving of the tractor is thus made much more comfortable and the vehicles are saved from undue strains and shocks. It is obvious that a series of shocks would be taken up by the swinging or rocking back and forth of the fifth wheel in the line of draft.

The hinging of the fifth wheel plate on a swinging support below the pivot of said support, whereby said plate is suspended and a full swing is had, may be carried out in numerous ways. In Figures 8 and 10 a square plate 25' having a depending marginal apron 28' replaces the plate 25. This plate has boxes 29' attached to the plate and apron by webs 30' and hinged on the shaft 20 by caps 31'. The plate is substantially centrally hinged and must be manually swung to a horizontal position for coupling. Its action is substantially the same as the plate 25. For latching the stud 13, a latch bar 41 is slidably mounted on the underside of the plate 25' and extends through the apron. A hook 42 at the inner end of the bar is engaged in the groove 13' of the stud and a cotter key 43 is used to fasten the bar in place.

In Figures 11, 12 and 13 another form is shown. The bearing sleeves 18 are omitted from the standards 15 and trunnions 44 are substituted therefor. The apron 28 of the plate 25 is provided with trunnions 46 instead of the boxes 29. Metal rings 45 carried by the upper trunnions 44 support the lower trunnions, said trunnions being notched to retain the rings. The rings take the place of the cranks 21 and the plate is mounted to swing as in Figures 1 to 10. This makes a simple and less expensive mounting as it eliminates machined and lined bearings.

The suspending of the fifth wheel plate or member from elevated pivots, transversely of the line of draft and on pivots below the supporting pivots, whereby the plate may swing in the line of draft and in an arc of sufficient length as to absorb the various shocks incidental to starting, stopping and road travel, is the important feature of the invention. Such an arrangement not only absorbs the shocks, but it provides a floating connection or coupling between the tractor and trailer which assures a more uniform transmission of power. In making sudden stops it is obvious that the trailer, having no brakes, will ride up to the tractor. When this occurs the plate will be swung from its rear or pulling position, forwardly in an arc of such amplitude as to take up and check such movement. This will not only save the vehicles from wear and injury, but will relieve the driver from the jolt.

The description which has been given recites more or less detail of a particular embodiment of the invention, which is set forth as new and useful, however, I desire it understood that the invention is not limited to such exact details of construction, because it is manifest that changes and modifications may be made within the scope of the appended claims, without departing from the spirit of the invention.

What I claim and desire to secure by Letters Patent, is:

1. A fifth wheel comprising, a pair of upwardly extending spaced supports having elevated pivots transverse to the line of draft, means for rigidly securing the supports on the bed of a vehicle and above the axle thereof, a swinging member between the pivots of the support for receiving the king pin, and means for suspending the member from the pivots of the support having pivotal connection with said member transversely of the line of draft and at a substantial distance below said pivots, whereby said member may be swung in an arc in the line of draft sufficient to absorb road shocks.

2. A fifth wheel comprising, bearing supports, a rock shaft having cranks mounted in the bearing supports, and a fifth wheel member carried by the rock shaft.

3. A fifth wheel comprising, bearing supports, a rock shaft having cranks mounted in said bearing supports, and a fifth wheel member carried by the rock shaft, said fifth wheel member having a flared king pin-receiving opening and a latching member movable across said opening.

4. A fifth wheel comprising, a shaft, cranks on the ends of the shaft, bearing supports for the cranks, and a fifth wheel member hinged on said shaft.

5. A fifth wheel comprising, a shaft, cranks on the ends of the shaft, bearing supports for the cranks, and a fifth wheel member hinged on the shaft and having its rear portion over-balanced, whereby it normally assumes an inclined position.

6. A fifth wheel comprising, a pair of spaced bearing supports, a shaft having cranks on its ends provided with trunnions for engaging in the bearing supports so that the shaft may swing in the arc of a circle, and a fifth wheel member for receiving a king bolt mounted on the shaft.

7. A fifth wheel comprising, supports having bearings, a crank shaft having cranks at its ends suspended from said bearings, a fifth wheel member carried by the shaft between its cranks and having a king pin-receiving opening, and latching means carried by the member and operable across the opening thereof.

8. A fifth wheel comprising, a pair of spaced supports having elevated bearings, a crank shaft having upright cranks at its ends provided with elevated trunnions journaled in the bearings of the supports, and a fifth wheel member hinged on the shank of said shaft between the cranks thereof and having a king pin-receiving opening located over the shank of the shaft.

9. A fifth wheel comprising, a pair of spaced supports having elevated bearings, a crank shaft having upright cranks at its ends provided with elevated trunnions journaled in the bearings of the supports, a fifth wheel member hinged on the shank of said shaft between the cranks thereof and having a king pin-receiving opening located over the shank of the shaft, the fifth wheel member having its rear portion overbalanced and provided with a flared crotch extending forwardly to said opening, and a latch mounted on said member and movable across said opening.

10. A fifth wheel comprising, a pair of spaced standards having elevated pivots and bases for mounting the standards on the bed of a vehicle, suspending members mounted on said pivots and depending therefrom, and a fifth wheel member having pivots engaging in the suspending members below the pivots of the standards, whereby the said member is supported to swing in the arc of a circle.

11. A fifth wheel comprising, a pair of spaced upright supports having means at their bases for rigidly mounting them on the bed of a vehicle, pivots on the upper ends of the supports, a swinging member disposed between the supports and having an opening also between said supports for receiving a king pin, and means for suspending the swinging member from the pivots of said supports having pivotal connection with said member below said pivots, whereby said member may be swung in an arc sufficient to absorb road shocks.

12. A fifth wheel comprising, a pair of spaced upright supports having means at their bases for rigidly mounting them on the bed of a vehicle, pivots on the upper ends of said supports, a swinging fifth wheel member disposed between the supports and having an opening for receiving a king pin depending from another vehicle, said member having a surface for guiding the king pin into said opening, and means for suspending the swinging member from the pivots of the support having pivotal connection with said member below said pivots, whereby said member may be swung in an arc sufficient to absorb road shocks.

13. A fifth wheel comprising, a pair of spaced upright supports having means at their bases for rigidly mounting them on the bed of a vehicle, pivots on the upper ends of said supports, a swinging plate disposed between the supports having an opening therein for receiving a king pin, and means for suspending the plate from the pivots of the support having pivotal connection with said plate below said pivots, whereby said plate may be swung in an arc sufficient to absorb road shocks.

14. A fifth wheel comprising, a pair of spaced upright supports having means at their bases for rigidly mounting them on the bed of a vehicle, pivots on the upper ends of said supports, a swinging plate disposed between the supports having an opening therein for receiving a king pin, means for suspending the plate from the pivots of the support having pivotal connection with said plate below said pivots, whereby said plate may be swung in an arc sufficient to absorb road shocks, and means for securing the king pin in the opening of the plate.

FRED G. SPENCER.